United States Patent (10) Patent No.: US 6,888,964 B2
Schlüter et al. (45) Date of Patent: May 3, 2005

(54) METHOD FOR THE REPRODUCTION OF AN ORIGINAL SCENE FROM AN ELECTRONICALLY SCANNED COLOR NEGATIVE OR DIAPOSITIVE FILM

(75) Inventors: Mathias Schlüter, Kiel (DE); Holger Klingspohr, Kiel (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 580 days.

(21) Appl. No.: 10/095,271

(22) Filed: Mar. 11, 2002

(65) Prior Publication Data

US 2002/0163658 A1 Nov. 7, 2002

(30) Foreign Application Priority Data

Mar. 19, 2001 (DE) .......................................... 101 13 247
Sep. 8, 2001 (DE) .......................................... 101 44 199

(51) Int. Cl.[7] ................................................ G06K 9/00
(52) U.S. Cl. ...................... 382/167; 382/169; 382/225; 382/274; 358/518; 358/521
(58) Field of Search ................................. 382/162, 164, 382/165, 166, 167, 168, 278, 274, 224, 225, 169; 358/515, 518, 519–521; 355/35, 38, 83, 115; 356/408; 348/663; 345/591

(56) References Cited

U.S. PATENT DOCUMENTS

| 4,998,286 | A | | 3/1991 | Tsujiuchi et al. |
| 5,406,394 | A | | 4/1995 | Numakura et al. |
| 5,781,315 | A | * | 7/1998 | Yamaguchi ................. 358/520 |
| 5,959,720 | A | | 9/1999 | Kwon et al. |
| 6,069,981 | A | * | 5/2000 | Murakami .................. 382/274 |
| 6,433,898 | B1 | | 8/2002 | Bestmann |
| 6,603,878 | B1 | * | 8/2003 | Takemoto ................... 382/167 |
| 6,665,434 | B1 | | 12/2003 | Yamaguchi |

FOREIGN PATENT DOCUMENTS

| DE | 43 09 879 C2 | 10/1993 |
| DE | 44 20 668 A1 | 3/1995 |
| DE | 195 01 358 A1 | 7/1996 |
| DE | 195 31 390 A1 | 2/1997 |
| EP | 0 723 363 A2 | 7/1996 |
| EP | 0 773 470 A1 | 5/1997 |
| EP | 0 967 791 A2 | 12/1999 |
| JP | 05 334 410 A | 12/1993 |
| JP | 10 340 336 | 12/1998 |
| JP | 2000 261 686 | 9/2000 |

* cited by examiner

Primary Examiner—Kanjibhai Patel
Assistant Examiner—Ali Bayat
(74) Attorney, Agent, or Firm—Laurence A. Greenberg; Werner H. Stemer; Gregory L. Mayback

(57) ABSTRACT

A method for the automatic reproduction of the colors of an original scene from an original image present as a color negative or diapositive film includes scanning the original image electronically, and storing the RGB color values of the image points as scanned transmissions or scanned densities. In the RGB color space, a gray straight line is determined, which approximates the cloud of points formed by the scanned densities of the image points in an optimum way. The transmissions are corrected by minimum transmission values in each case being subtracted from the scanned transmissions. Then, reconstructed film exposures are determined, whereby, by the gray straight line, film exposure straight lines are constructed that describe the relationship between the logarithmic film exposures and the corrected densities. Following the normalization of the film exposures to a standard image range, the film exposures are transformed into the LAB color space.

8 Claims, 7 Drawing Sheets

METHOD FOR THE REPRODUCTION OF AN ORIGINAL SCENE FROM AN ELECTRONICALLY SCANNED COLOR NEGATIVE OR DIAPOSITIVE FILM

BACKGROUND OF THE INVENTION

Field of the Invention

The invention relates to the field of electronic reproduction technology and pertains to a method for the automatic reproduction of the colors of the original scene from an electronically scanned original image, which is present as a color negative or diapositive film. In the case of a negative film as the original image, the method includes the conversion of color values from the color negative by an automatically determined negative/positive reciprocal function. The automatic reproduction of the original scene is primarily very important when processing color negative films because these materials are not conceived for direct visual observation.

Electronic image processing substantially includes the steps of image input, image processing and image output.

In the case of image input, for example, by a color image scanner, three analog color value signals (R, G, B) are obtained by trichromatic and image-point and line by line optoelectronic scanning of a colored original to be reproduced, each triplet of color values (R, G, B) representing the color components "red" (R), "green" (G) and "blue" (B) belonging to an image point scanned in the colored original. The analog color value signals are converted into digital color values and stored for the subsequent image processing.

During the image processing, the color values (R, G, B) are normally initially converted in accordance with the laws of subtractive color mixing into color separation values (C, M, Y, K), which are a measure of the metering of the printing inks "cyan" (C), "magenta" (M), "yellow" (Y) and "black" (K) used in the subsequent printing process. At the same time, during the image processing, generally local or selective color corrections are carried out with visual inspection on a color monitor, with the aim of improving the colored image reproduction or performing editing color changes. Alternatively, the color values (R, G, B) can also be converted, before the image processing, into device-independent color values such as LAB color values, for example.

Following the image processing, the image output is carried out by a suitable image output device, for example, an exposer or recorder, by point by point and line by line exposure of the processed color separation values from the colored image to be reproduced on a recording material, from which the printing plates for the multicolor printing of the colored image are then produced.

The colored originals to be scanned are generally diapositive films (color reversal films) or color negative films. Following development, a diapositive film may be viewed directly because it supplies a correctly colored image of the original. For the purpose of the colored image assessment of a diapositive film on a color monitor, it is, therefore, possible for the color values produced during the scanning of the diapositive film to be used directly or following color correction to drive the color monitor. A color negative film, on the other hand, does not supply a correctly colored image of the original scene following development. Only after the color negative has been recopied onto a special positive paper is it possible to view the photographed original scene in the correct colors. For the colored image assessment on a color monitor of the color values obtained during the scanning of the color negative, it is, therefore, necessary for a negative/positive reciprocal function to be determined first, with which the color values of the negative are converted into positive values in the correct color.

The fundamental construction and the operating mode of a color negative film is to be explained by using FIGS. 1a to 1c. FIG. 1a shows a color negative film 2, which is constructed from three individual film layers, namely a blue-sensitive yellow layer 3, a green-sensitive magenta layer 4 and a red-sensitive cyan layer 5. In FIG. 1a, it is assumed, by way of example, that the color negative film 2 is exposed to a relatively high quantity of blue light from the original scene 1. The blue-sensitive yellow layer 3 responds to blue light and lets green and red light through unimpeded. When exposed to blue light, during the chemical development of the negative 2, more yellow dye is formed in the yellow layer 3 the more intensely the layer was exposed to blue light. This is correspondingly true of the other two film layers, that is to say, the green-sensitive magenta layer 4 develops a magenta dye during the exposure to green light, and the red-sensitive cyan layer 5 develops a cyan dye during the exposure to red light. FIG. 1b shows the color negative film 2 after the development. As a result of the exposure to the large quantity of blue light, the yellow layer 3 now contains a great deal of yellow dye, which is identified in the drawing by the heavy hatching. The magenta layer 4 and the cyan layer 5 do not contain any dye because they have not been exposed. The developed negative 2 is transilluminated with white light and recopied onto positive photographic paper 6. The photographic paper 6 is likewise constructed from a blue-sensitive yellow layer 7, a green-sensitive magenta layer 8, and a red-sensitive cyan layer 9. The yellow layer 3 of the negative 2 to a large extent absorbs the blue component of the white copying light, so that only a little blue light falls onto the photographic paper 6 and exposes the blue-sensitive yellow layer 7 only a little there. The green and red components of the white copying light can penetrate unimpeded through the negative 2 and expose the colored layers 8 and 9 in the photographic paper 6 correspondingly intensely. FIG. 1c shows the result of the copying exposure following the development of the photographic paper 6. The yellow layer 7 contains only a little dye, the magenta layer 8 and the cyan layer 9 contain a great deal of dye, however. The interaction of the magenta and cyan colors, which are virtually the only ones present in the developed photographic paper 6, again results in a blue colored impression for the eye, which corresponds to the blue light coming from the original scene 1.

FIGS. 2a and 2b illustrate the fundamental construction and the operating mode of a diapositive film. FIG. 2a shows a diapositive film 10, which is also again constructed from three individual film layers, namely a blue-sensitive yellow layer 11, a green-sensitive magenta layer 12, and a red-sensitive cyan layer 13. As an example, it has again been assumed here that the diapositive film 10 is exposed to a great deal of blue light from the original scene 1. The blue-sensitive yellow layer 10 responds to blue light and lets green and red light through unimpeded. In the chemical development process for the diapositive film, a color reversal is already incorporated, that is to say, in the yellow layer 11, less yellow dye is formed the more intensely the layer was exposed to blue light. Such is correspondingly true for the other two film layers, that is to say, the green-sensitive magenta layer 12 develops a quantity of magenta dye during the exposure to green light, the quantity being inversely proportional to the quantity of light absorbed, and the red-sensitive cyan layer 5 develops an inversely proportional quantity of cyan dye during the exposure to red light. Because of such a property of the development process, the diapositive film is also designated a color reversal film. FIG. 2b shows the color layers of the diapositive film 10 for the assumed exposure example, following the development. The yellow layer 11 contains only a little dye because it was exposed with a great deal of blue light, and the magenta layer 12 and the cyan layer 13 contain a great deal of dye because they were not exposed. When viewed in transmitted light, the colors magenta and cyan result in the color impression blue.

Each color layer is characterized by a color density curve $D_r=r(H)$, $D_g=g(H)$ and $D_b=b(H)$, which indicates the relationship between the exposure H acting on the film and the color densities ($D_r$, $D_g$, $D_b$) in each case achieved in the individual film layers. The exposure H is the logarithm of the product of illumination intensity and exposure time and is measured in lux seconds. $D_r=r(H)$ is the color density curve for the red-sensitive cyan layer, $D_g=g(H)$ is the color density curve for the green-sensitive magenta layer, and $D_b=b(H)$ is the color density curve for the blue-sensitive yellow layer. FIG. 3 shows the color density curves for a color negative film in which, over a wide range, there is a linear relationship between the exposure H and the densities ($D_r$, $D_g$, $D_b$) achieved following the development of the film. The linear range is used when an original scene is recorded with a photographic camera. The slopes of the linear range are additionally positive, so that a high quantity of light during the recording corresponds to a high density in the film layer and therefore to a low transmission.

FIG. 4 shows the spectral density curve for the color layers yellow, magenta, and cyan (Y, M, C) of the color negative film. The curve results in the fact that the color layers are in each case not just sensitive in one spectral range (blue, green, red) but also to some extent in the other spectral ranges. For example, the magenta layer and the cyan layer are also to a small extent sensitive to blue light and, during the development, form some dye that, together with the dye formed in the yellow layer, leads to graying of the color. To correct the secondary color densities and saturation losses caused by these secondary absorptions, color negative films are masked. During the development, in addition to the layer dyes, colored opposing positives (masks) are formed by mask dyes and add to the secondary color densities to form a uniform color cast on the negative. When the negative is copied to the photographic paper, the color cast is filtered out. Because of the color masking of the color negative film, the three color density curves $D_r$, $D_g$, and $D_b$ are not coincident, so that the density values each exhibit an offset value, as a result of which, for example during the exposure of a gray value, three different color density values are produced (FIG. 3).

FIG. 5 shows the color density curves for a diapositive film that are largely coincident. The linear range in the central part of the curves, which has a greater slope than in the case of a color negative film, is used when recording an original scene with a photographic camera. The slopes of the linear range are negative, so that a high quantity of light during the recording corresponds to a low density in the film layer and, therefore, to high transmission.

In the prior art methods for the reproduction of an original scene from the color values obtained by scanning a diapositive film or color negative film, first of all, a representative highlight value for the lightest image regions and a representative shadow value for the darkest image regions are determined, to which specific reference values for the highlight and the shadow in the color space used for the reproduction are then allocated. By a color space transformation, all the scanned color values are then converted into the reproduction color space such that the color range between the representative highlight and shadow value is projected onto the color range in the reproduction color space predefined by the reference values of highlight and shadow. During the reproduction of a color negative, highlight and shadow are further inverted, that is to say, the representative highlight value of the scanned color values has a lower transmission than the representative shadow value. The reference value for highlight, on the other hand, has a higher transmission than the reference value for shadow. As a result of the normalization of the color ranges of all three color components onto the predefined reference color range, the offset of the color density curves of the color negative is eliminated, which corresponds to filtering out the color masking. The representative highlight value and shadow value of the scanned color values are in the simplest case defined by an operator, who views the scanned image on a color monitor and marks one or more representative light and dark image points in the image. Automatic methods have also been disclosed, which determine the representative highlight value and shadow value on the basis of a histogram analysis of the scanned color values in their color components (R, G, B).

In German Patent DE 43 09 879 C2, a method for the analysis of the image range of original images is described in which the scanned image values are transformed into a lightness component and two color components. From the histogram of the lightness values, the representative highlight value and shadow value are determined, various image types being distinguished by using the shape of the histogram in the range of higher lightness values and in the range of lower lightness values and, on this basis, the highlight value and the shadow value being defined in accordance with different criteria.

In U.S. Pat. No. 6,069,981 to Murakami, a method for determining suitable representative image highlight and image shadow values for the reproduction of color negative films is described, in which, for various selected color values in the image, a check is made to see whether or not they lie close enough to the gray line. If they lie too far from the gray line, they are discarded. The check is carried out by a comparison with calculated RGB color values in accordance with a formula that has been derived from the scanned values of a gray wedge exposed on the negative material.

In German Published, Non-Prosecuted Patent Application DE 195 31 390 A1, a method is described for the conversion of color values from a color negative in accordance with a negative/positive reciprocal function, in which, following an image analysis in order to determine the representative values for highlight and shadow in the color components, a color reversal is carried out with simultaneous gradation adaptation. The negative/positive reciprocal function is stored as a value table in a table memory, and the color values of the color negative are converted by the value table into the color values of the corresponding color positive.

The conventional methods for the reproduction of an original scene from the color values of a scanned color negative film or diapositive film are based on the determination of representative values for highlight and shadow, which are then converted into corresponding reference values for the color space of the reproduction. At the same time, the colors on the connecting line between the highlight and shadow points in the RGB color space of the scanned color densities are projected onto the gray axis of the reproduction color space. In such a way, a fault-free and optimum reproduction quality is obtained only if the gray axis in the color space of the scanned color values also lies on the connecting line between the highlight and shadow points. However, this is not always ensured by the methods for defining these points in the conventional methods, so that the reproduction can exhibit an undesired color cast. Furthermore, in the case of the conventional methods, the color reversal in the color negative film is permanently associated with the adaptation of the range, which means that in the regions of very light and very dark colors, losses in contrast and also color casts in the reproduction may result. Nor do the conventional methods take in the existing inadequacies of the color layers and the scanning devices, which means that additional color errors may arise in the scanned color values.

SUMMARY OF THE INVENTION

It is accordingly an object of the invention to provide a method for the reproduction of an original scene from an electronically scanned color negative or diapositive film that overcomes the hereinafore-mentioned disadvantages of the heretofore-known devices and methods of this general type and that proceeds automatically for the reproduction of an original scene from an electronically scanned color negative film or diapositive film with which the erroneous reproduction of the conventional methods is avoided and good reproduction quality as well as high accuracy is achieved in the color reversal from negative films.

With the foregoing and other objects in view, there is provided, in accordance with the invention, a method for automatic reproduction of colors of an original scene from an original image, including the steps of presenting the original image as one of an electronically scanned color negative and an electronically scanned diapositive film having image points, storing RGB color values of image points as one of the group consisting of scanned transmissions and scanned densities, determining, in an RGB color space, a gray straight line optimally approximating a principal axis of a cloud of points formed by scanned densities of the image points, determining corrected transmissions to which corrected densities correspond by respectively subtracting minimum transmission values from the scanned transmissions, determining reconstructed film exposures utilizing the corrected transmissions, whereby, film exposure straight lines are constructed with the gray straight line, the film exposure straight lines describing a relationship between logarithmic film exposures and the corrected densities, and projecting the reconstructed film exposures onto an image range between a normalized highlight fixed point and a normalized shadow fixed point, and determining normalized film exposures.

In accordance with another mode of the invention, a direction of the gray straight line is determined by an eigenvector with a largest eigenvalue of a covariance matrix of image point vectors, components of each image point vector being the scanned densities of the image point.

In accordance with a further mode of the invention, the gray straight line runs through a center of gravity of the cloud of points.

In accordance with an added mode of the invention, the gray straight line runs through a predefined neutral shadow point.

In accordance with an additional mode of the invention, the minimum transmission values are determined from a condition where the corrected densities of an image point of maximum density lie on the gray straight line.

In accordance with a concomitant mode of the invention, the normalized film exposures are transformed into a LAB color space.

Other features that are considered as characteristic for the invention are set forth in the appended claims.

Although the invention is illustrated and described herein as embodied in a method for the reproduction of an original scene from an electronically scanned color negative or diapositive film, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 6:
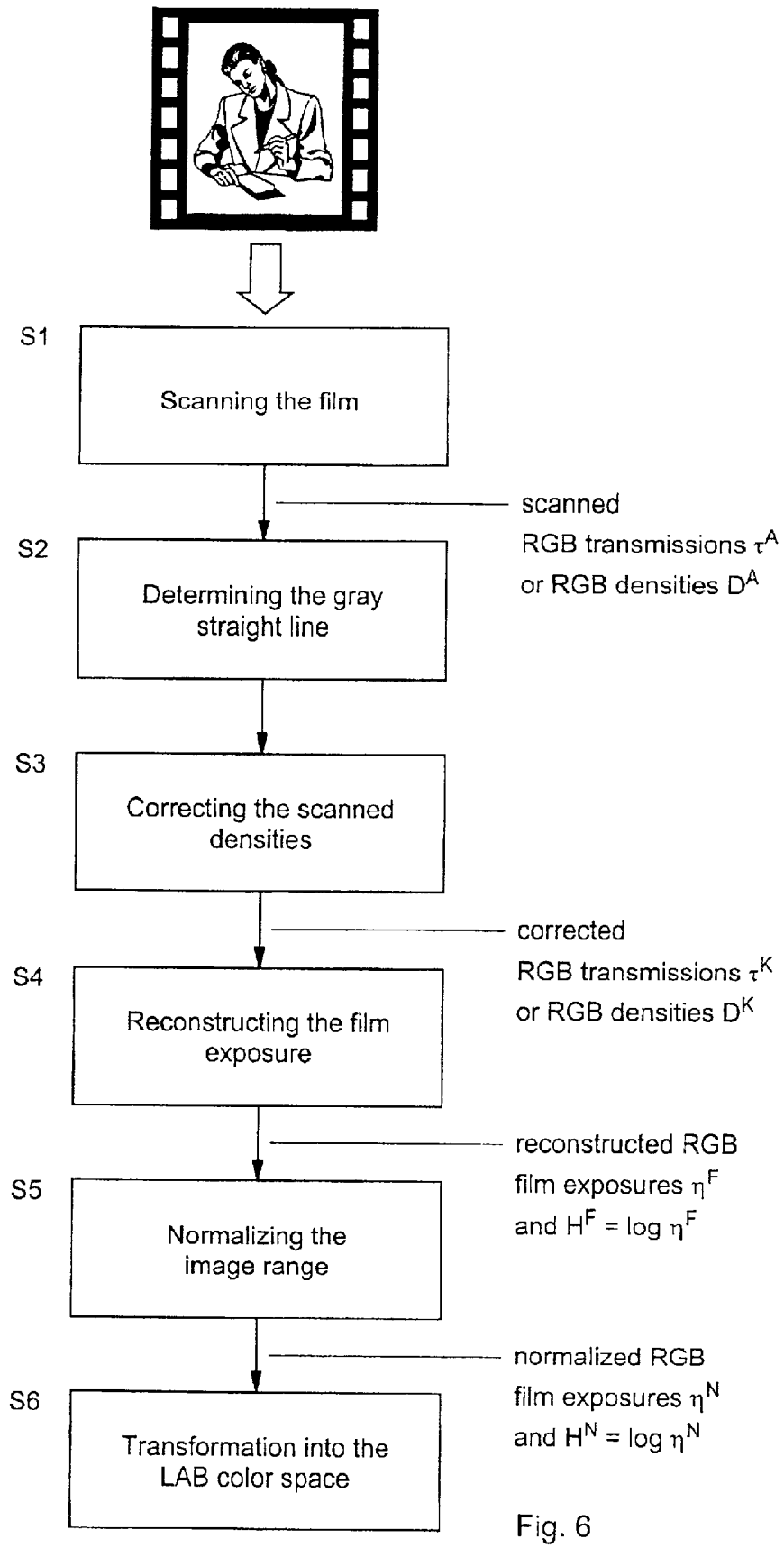
FIG. 6 is a flowchart for the reproduction method according to the invention.

Referring now to the figures of the drawings in detail and first, particularly to FIG. 6 thereof, there is shown a flowchart for the method steps S1 to S6 of the reproduction method according to the invention.

Herein, the steps will firstly be outlined roughly to provide a summary of the method. Then, the steps will be explained in detail.

In step S1, an original image, which may be a color negative film or a diapositive film, is scanned by a color image scanner, for example, a scanner or a digital camera. The scanner illuminates the original image, divides it up into individual image points with a specific resolution and the light shining through each image point is broken down, using a configuration of generally three color filters, into a red, a green, and a blue light component. The intensities of the light components are measured by sensor elements as scanned RGB transmissions $\tau_r^A$, $\tau_g^A$, $\tau_b^A$ and stored as digital color values. The scanned RGB transmissions $\tau_r^A$, $\tau_g^A$, $\tau_b^A$ can also be expressed in logarithmic form as scanned RGB densities $D_r^A$, $D_g^A$, $D_b^A$, the following relationship being true:

$$D_r^A = -\log \tau_r^A; D_g^A = -\log \tau_g^A; D_b^A = -\log \tau_b^A. \quad (1)$$

In step S2, the scanned RGB densities are used to determine a gray straight line. The RGB densities of all the scanned image points form a more or less elongated cloud of points in the RGB color space, their principal axis in the longitudinal direction forming the gray straight line. The direction of the gray straight line is determined by covariance analysis of the scanned RGB densities.

Then, in step S3, in the region of high color densities, a saturation correction of the densities is carried out by elevating the high scanned RGB densities in a nonlinear manner. Such action partly compensates for inadequacies of the film material and of the scanning device and improves the reproduced image quality. The result of the correction is the corrected RGB transmissions $\tau_r^K$, $\tau_g^K$, $\tau_b^K$ and the corrected RGE densities $D_r^K$, $D_g^K$, $D_b^K$, for which the following relationship is true:

$$D_r^K = -\log \tau_r^K; D_g^K = -\log \tau_g^K; D_b^K = -\log \tau_b^K. \quad (2)$$

In step S4, the corrected RGB transmissions are used to reconstruct the associated film exposures, in that the position and the slope are determined for the color density curves, which are approximately linear in the corrected RGB densities. From this, one obtains the reconstructed RGB film exposures $\eta_r^F$, $\eta_g^F$, $\eta_b^F$ and the associated logarithmic film exposures $H_r^F$, $H_g^F$, $H_b^F$, the following relationship being true:

$$H_r^F = \log \eta_r^F; H_g^F = \log \eta_g^F; H_b^F = \log \eta_b^F. \quad (3)$$

In step S5, the exposure ranges in the three color channels are normalized to a standardized exposure range, from which the normalized RGB film exposures $\eta_r^N$, $\eta_g^N$, $\eta_b^N$ and the associated logarithmic normalized film exposures $H_r^N$, $H_g^N$, $H_b^N$ result, the following relationship being true:

$$H_r^N = \log \eta_r^N; H_g^N = \log \eta_g^N; H_b^N = \log \eta_b^N. \quad (4)$$

In the last step S6, the normalized RGB film exposures are finally transformed into the LAB color space or into another color space suitable for the further processing of the image data. To carry out steps S1 to S6, all the image points scanned at the high reproduction resolution can be used. To save computing time and storage space, however, it is more advantageous to determine the gray straight line, the correction parameters, and the further parameters and reference values required for the reproduction by using a representative partial set of the image points, for example, by using the image points from an image previously scanned at a coarser resolution (prescan). Following the determination of the reproduction parameters, the image is then scanned again at the desired high resolution, and the reproduction parameters determined are applied to the highly resolved image points.

Figure 7:
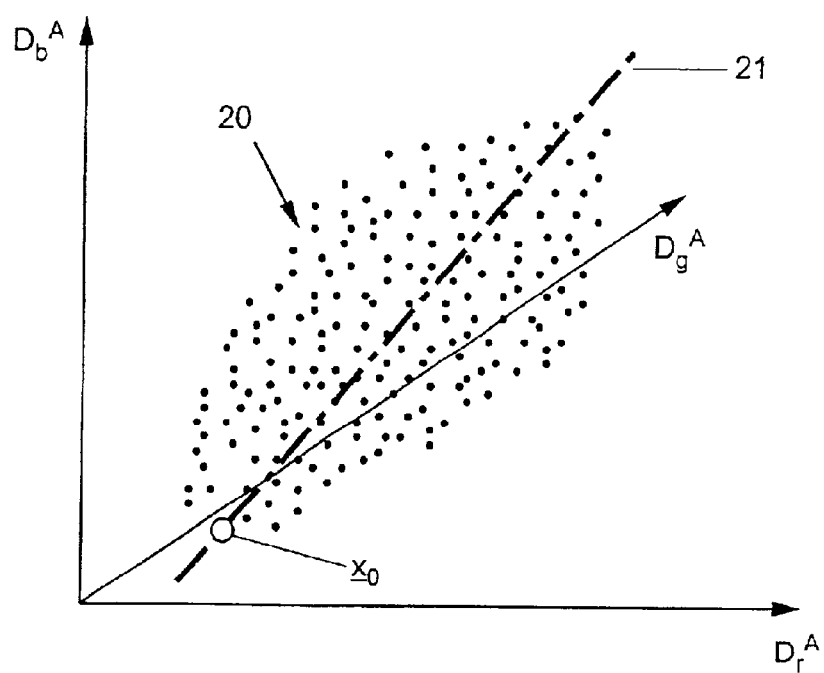
FIG. 7 is a graph illustrating the scanned densities $D^A$ in the RGB color space according to the invention.

FIG. 7 shows the scanned RGB densities $D^A$ in the RGB color space. The densities of each image point represent a point in the RGB color space with the values $D_r^A$, $D_g^A$, $D_b^A$. All the image points together form the cloud of points 20, which extends in a more or less elongated form along the gray straight line 21 of the image. The gray straight line 21 represents image points whose combination of the three density values $D_r^A$, $D_g^A$, $D_b^A$ results in a color-neutral gray value. The gray straight line 21 is described in general terms by the vectorial parameter equation:

$$\underline{G}(t) = \underline{s}_0 + t \times \underline{e}. \quad (5)$$

In the equation, $\underline{s}_0$ is a vector through whose end point the straight line $\underline{G}(t)$ runs, and $\underline{e}$ is a unit vector that determines the direction of the straight line. The vectors in each case have the three components $D_r$, $D_g$, $D_b$.

In step S2 of the reproduction method according to the invention, the gray straight line 21 of the image is determined as the principal axis of the cloud of points 20, that is to say, as the straight line that approximates the cloud of points 20 in an optimum way. To such an end, the gray straight line 21 is placed in the cloud of points 20 such that the mean of the squared shortest distances between the points in the cloud of points 20 and the gray straight line 21 becomes a minimum. The solution to such a minimization task firstly results in the gray straight line 21 running through the center of gravity M of the cloud of points 20, that is to say, the center of gravity lies at the tip of the vector $\underline{s}_0$ in equation (5). The center of gravity M is determined by forming an average component by component of the density values of the cloud of points 20, in vectorial notation:

$$\underline{M} = \frac{1}{N} \sum_x \underline{D}_x^A. \quad (6)$$

Here, $\underline{M}$ is a column vector with the components $\underline{M} = \underline{s}_0 = (D_{rM}, D_{gM}, D_{bM})^T$, and the individual points in the cloud of points 20 are described by the column vectors $\underline{D}_x^A = (D_{rx}^A, D_{gx}^A, D_{bx}^A)^T$. The solution to the minimization task further results in the vector $\underline{e}$ being the eigenvector $\underline{e}_0$ with the largest eigenvalue $\lambda_0$ of the covariance matrix $\underline{\underline{C}}$ of the image point vectors $\underline{D}_x^A$.

$$\underline{\underline{C}} = \frac{1}{N} \sum_x (\underline{D}_x^A)(\underline{D}_x^A)^T - \underline{M}\underline{M}^T. \quad (7)$$

The covariance matrix $\underline{\underline{C}}$ is calculated from the component by component averaging of the elements of the matrix $(\underline{D}_x^A)(\underline{D}_x^A)^T$ and of the center of gravity matrix $\underline{M}\,\underline{M}^T$. In accordance with prior art computing methods, for example, the Jacobi method [William H. Press et al.: Numerical Recipes; Cambridge University Press; 1992; pp. 463–469], the three eigenvalues $\lambda_0$, $\lambda_1$, $\lambda_2$ and the associated eigenvectors are determined from the covariance matrix $\underline{\underline{C}}$. The eigenvectors $\underline{e}_0$, $\underline{e}_1$, $\underline{e}_2$ are unit vectors, that is to say, are normalized to length 1, and are orthogonal in pairs. The eigenvector $\underline{e}_0$ describes the direction of the principal axis of the cloud of points, that is to say, the direction in which it predominantly extends, and the eigenvectors $\underline{e}_1$ and $\underline{e}_2$ describe subsidiary axes of the cloud of points that are perpendicular thereto.

According to a variant of the method according to the invention, a point $\underline{x}_0 = (D_{r0}, D_{g0}, D_{b0})$ is predefined in the RGB color space, through which the gray straight line 21 is intended to run. For such a purpose, a color-neutral shadow point is preferably selected from the scanned image points. The automatic determination of a color-neutral shadow point, for example, in accordance with the method described in German Patent DE 43 09 879 C2, is substantially less critical than the determination of a highlight point because the shadows in most images are color neutral and color casts in the shadows are less striking. In FIG. 7, the point $\underline{x}_0$ for the scanned densities of a color negative film is shown. According to the variant, the direction of the gray straight line 21 is determined from the eigenvector $\underline{e}_0$ of the modified covariance matrix $\underline{\underline{C}}_0$.

$$\underline{\underline{C}}_0 = \frac{1}{N} \sum_x (\underline{D}_x^A)(\underline{D}_x^A)^T - \underline{x}_0 \underline{M}^T + \underline{M} \underline{x}_0^T + \underline{x}_0 \underline{x}_0^T \quad (8)$$

For the case $\underline{x}_0 = \underline{M}$, equation (8) changes to equation (7). If the user is not completely satisfied with the automatic determination of the gray straight line 21, the gray straight line 21 can be defined manually by selecting a further neutral point in the image. The selected point should correspond to a lighter gray value in the original image than the gray value of the point $\underline{x}_0$.

Figure 1A:
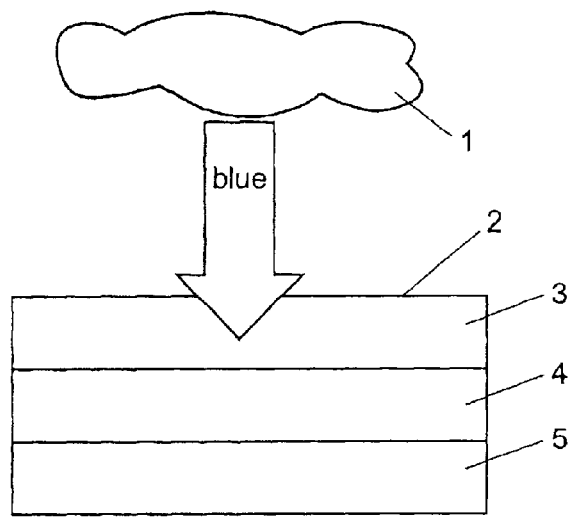
FIGS. 1a to 1c are diagrammatic representations of the construction and the mode of operation of a color negative film.
Figure 1B:
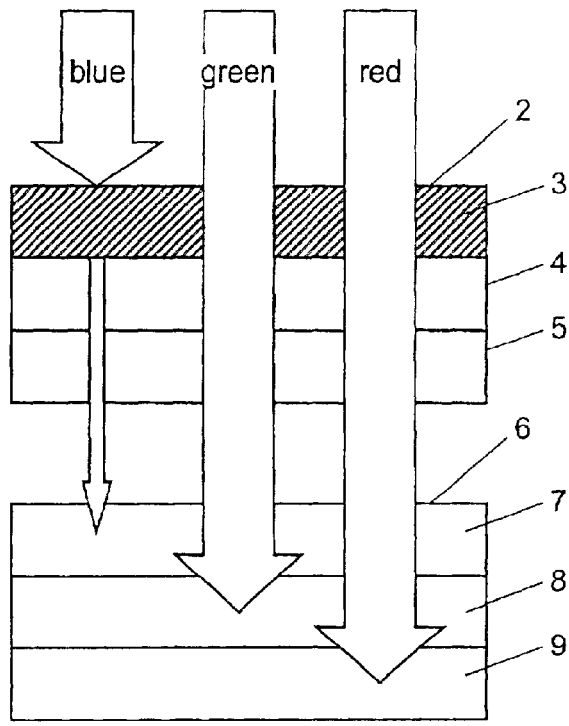
Figure 1C:
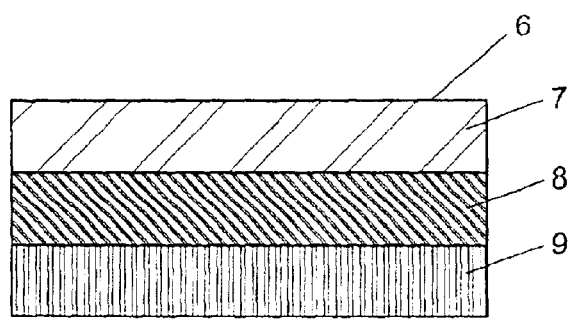
Figure 2A:
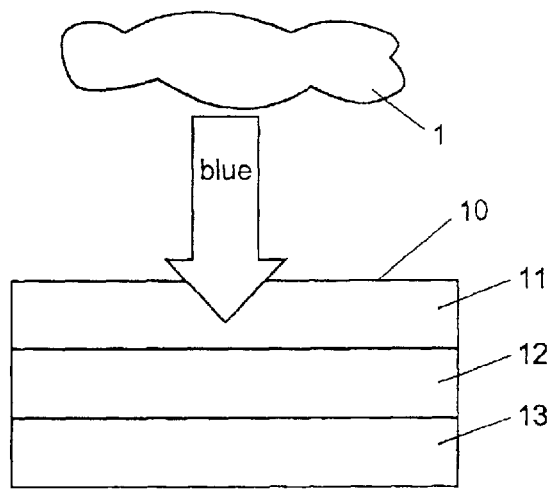
FIGS. 2a and 2b are diagrammatic representations of the construction and the mode of operation of a diapositive film.
Figure 2B:
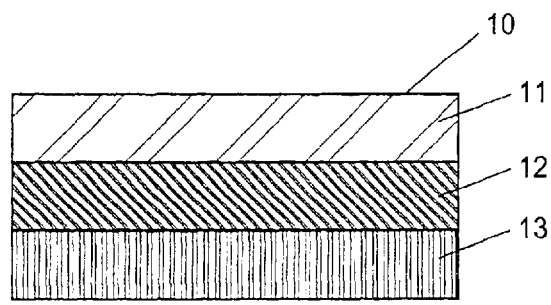
Figure 3:
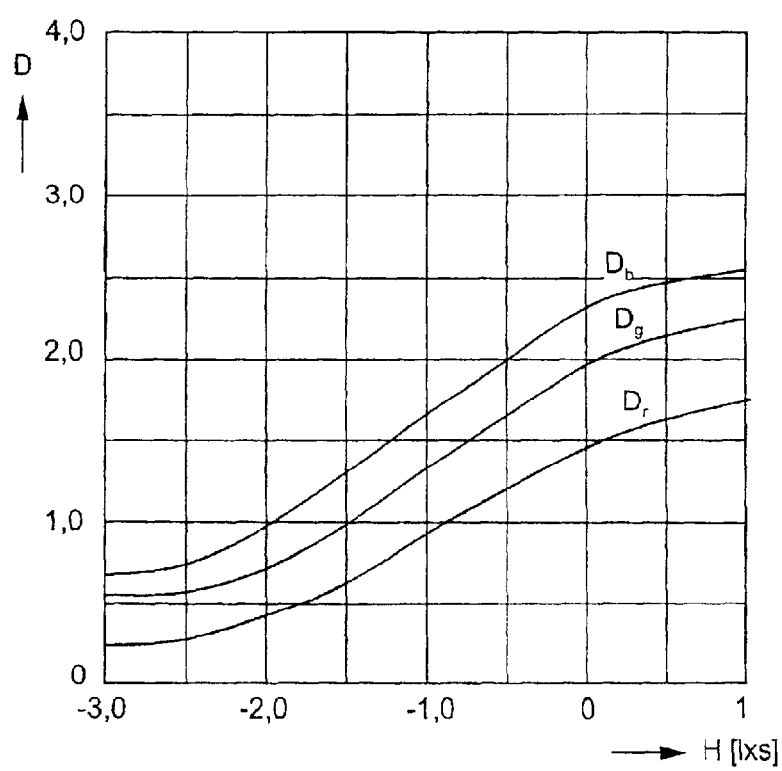
FIG. 3 is a graph illustrating the color density curves of a color negative film.
Figure 4:
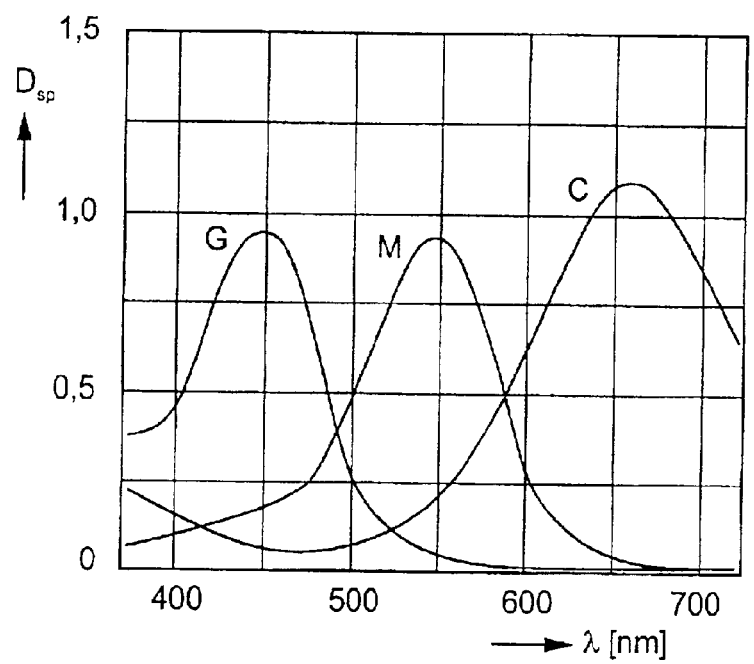
FIG. 4 is a graph illustrating the spectral density curves of the color layers in a color negative film.
Figure 5:
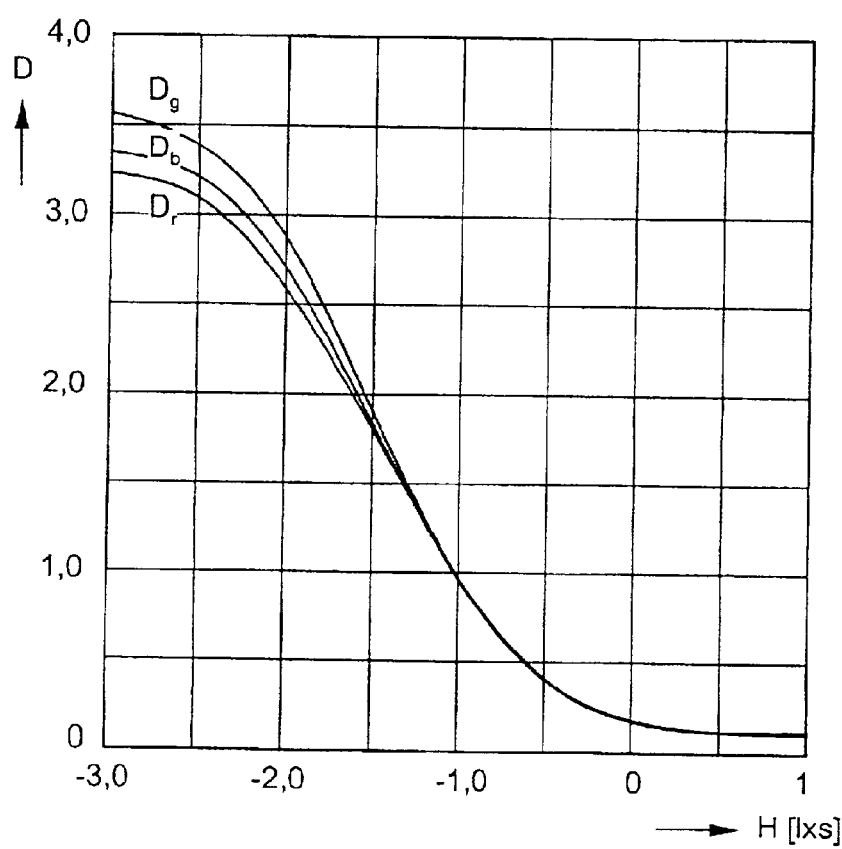
FIG. 5 is a graph illustrating the color density curves of a diapositive film.

Following the determination of the gray straight line 21, in step S3 a saturation correction of the densities is performed in the region of high color densities, by elevating the high scanned RGB densities in a nonlinear manner. On the color density curves for a color negative film in FIG. 3, it can be seen that for high film exposures H, it is not possible to achieve any desired high densities D, nor that the transmissions $\tau$ become as small as desired. Likewise, FIG. 5 reveals for a diapositive film that, for extremely low film exposures H, it is not possible to achieve any desired high densities D, nor that the transmissions $\tau$ become as small as desired. This is due to the fact that the quantity of dyes in the color layers is limited. Added to this is the further effect that the color filters used for the scanning in the scanner do not fit the spectral density curves of the color layers yellow, magenta, and cyan, that is to say, they have their maxima at different wavelengths and also have a different spectral curve. As a result, the scanned densities $D^A$ are still smaller than the actual color densities D of the film. All these effects together have the effect that transmissions cannot fall below minimum transmission values $\underline{\tau}^A_{min} = (\tau^A_{r\,min}, \tau^A_{g\,min}, \tau^A_{b\,min})$.

To correct the effect, the minimum transmissions are subtracted from the scanned transmissions, that is to say, the corrected transmissions $\underline{\tau}^K = (\tau^K_r, \tau^K_g, \tau^K_b)$ are given by:

$$\underline{\tau}^K = \underline{\tau}^A - \underline{\tau}_{min}^A. \quad (9)$$

The corrected densities $\underline{D}^K$ correspond to these, $$\underline{D}^K = -\log(\underline{\tau}^A - \underline{\tau}_{min}^A). \quad (10)$$

To define the minimum transmissions, a color-neutral point with high scanned densities $\underline{D}^A_{max}$ in the scanned image points is selected, and the condition is set up that the corrected densities $\underline{D}^K_{max}$ of the color-neutral point lie on the gray straight line 21. In such a case, it is assumed that the position of the gray straight line 21 in the color space of the corrected densities $\underline{D}^K$ does not change noticeably with respect to the color space of the scanned densities $\underline{D}^A$. The assumption is confirmed by practice. For the corrected densities $\underline{D}^K_{max}$ of the point of maximum density, it is, then, true that:

$$\underline{D}_{max}^K = -\log(10^{-\underline{D}_{max}^A} - \underline{\tau}_{min}^A) = \underline{x}_0 + \underline{e}_0 t. \quad (11)$$

By solving this equation for $\underline{\tau}^A_{min}$, values for the minimum transmissions $\underline{\tau}^A_{min} = (\tau^A_{r\,min}, \tau^A_{g\,min}, \tau^A_{b\,min})$ can be determined.

$$\tau^A_{r\,min} = 10^{-D^A_{r\,max}} \left(1 - 10^{-e_{0r}(t - (D^A_{r\,max} - x_{0r})/e_{0r})}\right) \quad (12)$$

$$\tau^A_{g\,min} = 10^{-D^A_{g\,max}} \left(1 - 10^{-e_{0g}(t - (D^A_{g\,max} - x_{0g})/e_{0g})}\right)$$

$$\tau^A_{b\,min} = 10^{-D^A_{b\,max}} \left(1 - 10^{-e_{0b}(t - (D^A_{b\,max} - x_{0b})/e_{0b})}\right)$$

In the equations (12), the parameter t is selected such that, firstly, the result is the smallest possible values for $\underline{\tau}^A_{min}$ and that, secondly, all the components of $\underline{\tau}^A_{min}$ are positive. For conventional color negative films with an orange masking, the parameter t should be selected such that the condition $\tau^A_{r\,min} \geq \tau^A_{g\,min} \geq \tau^A_{b\,min}$ is additionally satisfied.

Figure 8:
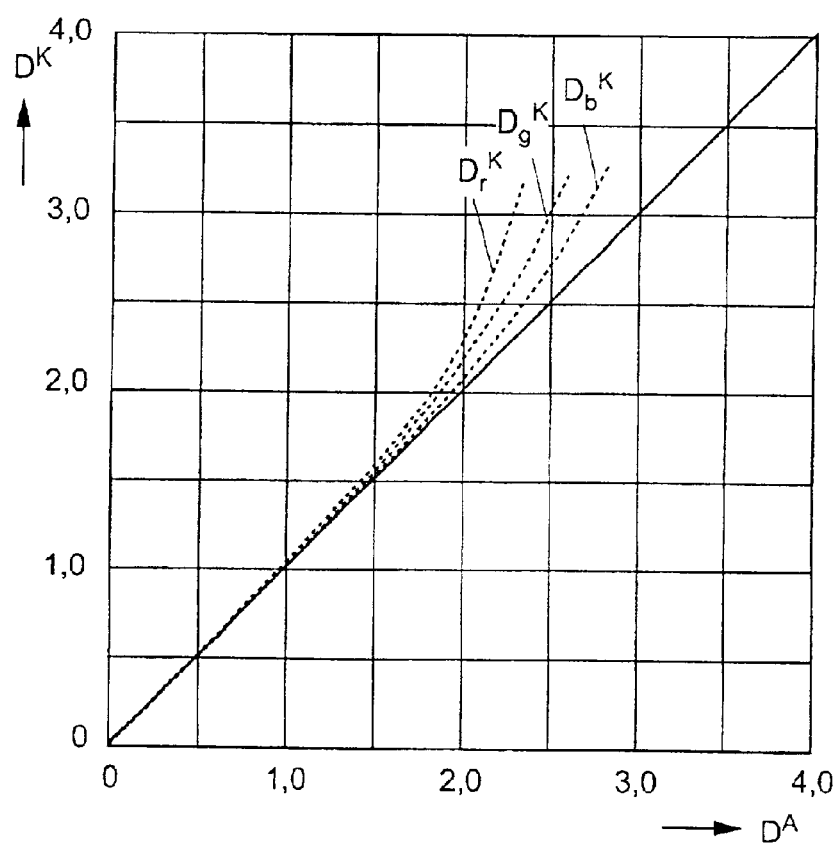
FIG. 8 is a graph illustrating the corrected densities $D^K$ as a function of the scanned densities $D^A$ according to the invention.
Figure 9:
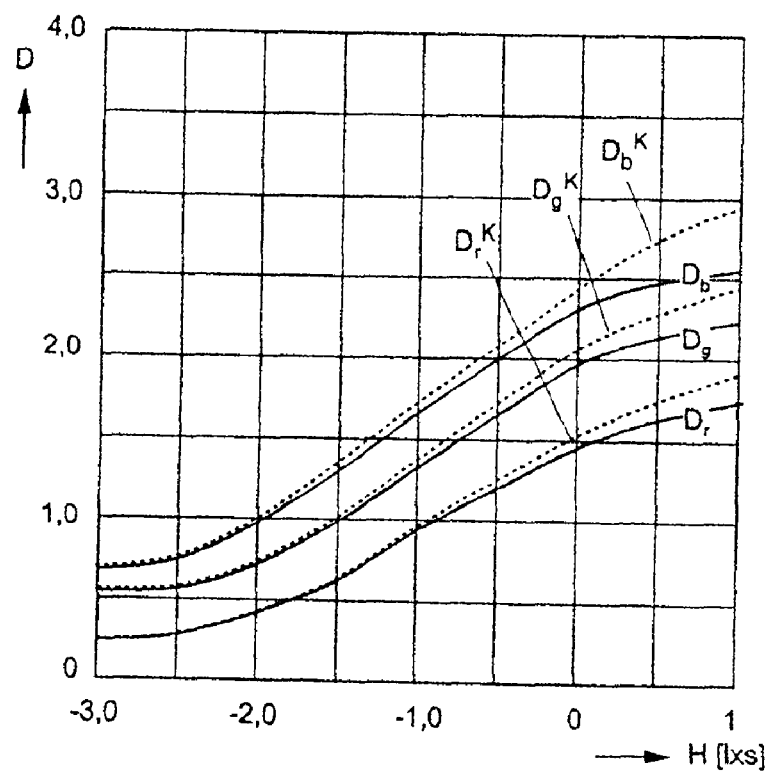
FIG. 9 is a graph illustrating the corrected color density curves of a color negative film according to the invention.

FIG. 8 shows an example for densities $\underline{D}^K$ corrected in accordance with equation (10) as a function of the uncorrected densities $\underline{D}^A$. In the region of high color densities, the densities are elevated in a nonlinear manner by the correction. As a result, the saturation effects and scanning errors are at least partly calculated out. FIG. 9 shows, using the example of the color negative film, that the corrected color density curves corresponding to the corrected densities then exhibit lower saturation. As a result of the correction, the linear range of the color density curves is widened and, so to speak, a more ideal film material is simulated. If, as a result of overexposure during the recording of the original image, the densities of part of the scanned image points lie in the saturation region of the original color density curves, then the exposure error is compensated or at least reduced by the correction, which improves the image quality of the reproduced image.

In step S4, the corrected transmissions $\underline{\tau}^K$ are used to reconstruct the associated film exposures $\underline{\eta}^F$ and the logarithmic film exposures $\underline{H}^F = \log \underline{\eta}^F$, by determining the position and the slope for the central linear part of the color density curves. For the relationship between the logarithmic film exposures $\underline{H}^F$ and corrected densities $\underline{D}^K$, linear equations with still unknown parameters a and b are used:

$$\underline{H}^F = \underline{a} + \underline{b} \times \underline{D}^K. \quad (14)$$

In component notation, these equations are:

$$H_r^F = a_r + b_r \times D_r^K \quad (14)$$

$$H_g^F = a_g + b_g \times D_g^K$$

$$H_b^F = a_b + b_b \times D_b^K$$

The relationship must also apply to the image points on the gray straight line 21, that is to say, as a result of inserting the relationship for the gray straight line 21, it is true that:

$$H_r^F = a_r + b_r \times x_{0r} + b_r \times e_{0r} \times t \quad (15)$$

$$H_g^F = a_g + b_g \times x_{0g} + b_g \times e_{0g} \times t$$

$$H_b^F = a_b + b_b \times x_{0b} + b_b \times e_{0b} \times t$$

On the other hand, it must be true of all the points on the gray straight line 21 that they were produced by the same film exposure values during the exposure, that is to say, that the following is true for all values of the parameter t:

$$H_r^F = H_g^F = H_b^F. \quad (16)$$

The condition is only satisfied when the three straight lines described in the equations (15) are coincident, that is to say, firstly, the factors of the parameter t have the same value and, secondly, the constant components have the same value.

$$b_r \times e_{0r} = b_g \times e_{0g} = b_b \times e_{0b} = \lambda$$

$$a_r + b_r \times x_{0r} = a_g + b_g \times x_{0g} = a_b + b_b \times x_{0b} = K \quad (17)$$

The result of this, for the parameters $a_i$ and $b_i$ of the film exposure straight lines according to equation (14), is as follows, the index i standing for r, g, or b:

$$b_i = \lambda/e_{0i}$$

$$a_i = -x_{0i} \times \lambda/e_{0i} + K \quad (18)$$

Figure 10:
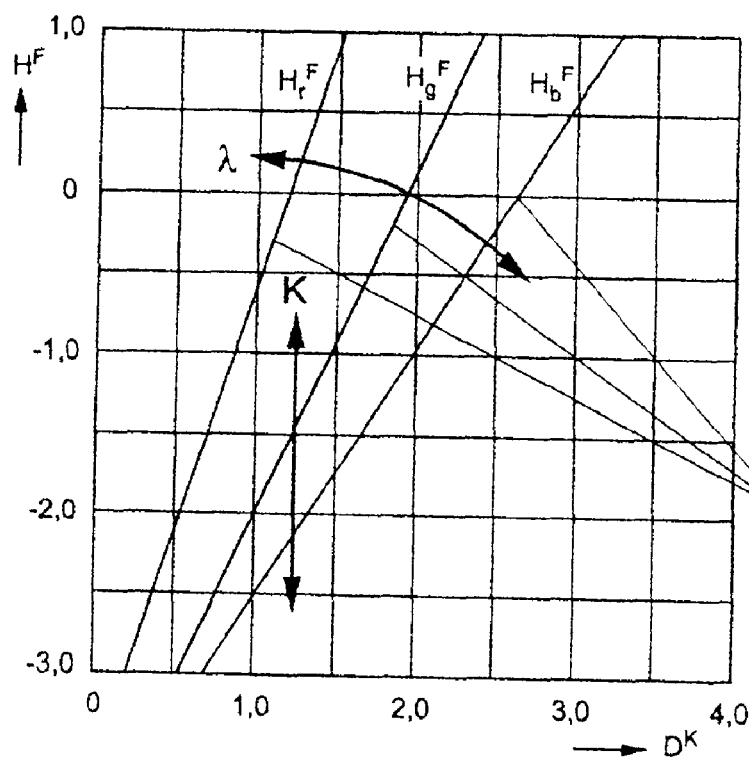
FIG. 10 is a graph illustrating an example of the is reconstructed film exposure straight lines according to the invention.

FIG. 10 shows an example of the film exposure straight lines 22 determined in this way. The constant K, with which the straight lines can be shifted in the $H^F$ direction, and the factor $\lambda$, with which the slopes of the straight lines can be changed, can in this case be selected freely. These variables are open because it is not possible to see from the scanned and corrected densities $D_i^K$ what absolute quantities of light were required when recording the image to produce the scanned densities in the color layers of the film. That is to say, it is not known what sensitivity the film material had. From the relative position and slope of the film exposure straight lines 22 in relation to one another, it is possible to derive only what ratio between the quantities of light was required to produce the scanned densities. During the reproduction of the image, however, only this information is needed, that is to say, the knowledge of the absolute quantities of light is not required. For this reason, the constant variables K and $\lambda$ can be selected freely within certain limits. They are expediently selected such that the resulting values for $H_i^F$ correspond to a film material with, for example, an average film sensitivity, used in practice.

The result of converting equations (14) into the non-logarithmic reconstructed film exposures $\eta_i^F$, in conjunction with equation (9), results in:

$$\eta_i^F = 10^{H_i F} = 10^{a_i + b_i \times D_i K} = 10^{a_i}(10^{D_i K})^{b_i} = C_i(\tau_i^K)^{-b_i} = C_i(\tau_i^A - \tau_{i\,min}^A)^{-b_i}. \quad (19)$$

Here, the index i stands for r, g, or b and the values $C_i$ are constants derived from the parameters $a_i$. After method steps S1 to S4 have been carried out, the reconstructed film exposures $\eta_i^F$ can be calculated from the scanned transmissions $\tau^A$ in accordance with equations (19). With the calculation of the reconstructed film exposures $\eta_i^F$ in the case of color negative films, the offset of the color density curves is also eliminated, which corresponds to filtering out the color masking.

Figure 11:
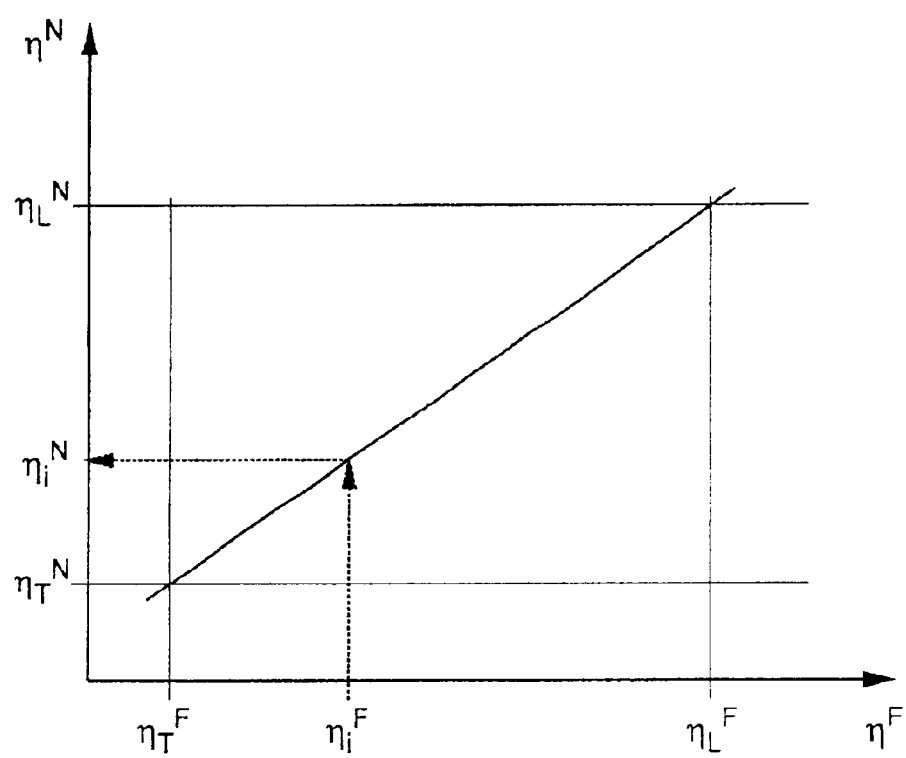
FIG. 11 is a graph illustrating the normalization of the reconstructed film exposures.

In step S5, the reconstructed film exposures $\eta_i^F$ are normalized by adapting the range to a standardized exposure range. For such a purpose, highlight points $\eta_L^F$ and shadow points $\eta_T^F$ are obtained, for example, from a histogram analysis of the reconstructed film exposures $\eta_i^F$. These highlights and shadows, which are selected to be equal for all components, are projected onto a normalized highlight fixed point $\eta_L^N$ and a normalized shadow fixed point $\eta_T^N$. FIG. 11 shows this in a graph. This results in the relationship for the normalized film exposures $\eta_i^N$ as:

$$\eta_i^N = \frac{\eta_L^N - \eta_T^N}{\eta_L^F - \eta_T^F}(\eta_i^F - \eta_T^F) + \eta_T^N. \quad (20)$$

In the last step S6, the normalized film exposures $\eta_i^N$ are finally transformed into the LAB color space or into another color space suitable for the further steps in processing the reproduced image data. The transformation into the LAB color space is carried out, for example, by a three-dimensional allocation table (lookup table), which, for each possible combination of the three normalized film exposures $\eta_r^N, \eta_g^N, \eta_b^N$, contains the associated LAB color values. To save storage space, the associations between the film exposures and the LAB color values are preferably stored only for the grid points of a three-dimensional grid with a lower resolution in the RGB color space. For combinations of the three normalized film exposures $\eta_r^N, \eta_g^N, \eta_{bN}$ lying between these, the associated LAB color values are interpolated from the LAB color values stored for the adjacent grid points. The LAB color values to be allocated to the grid points are obtained by colored panels with colored areas whose LAB color values are to be measured being photographed on the film material that is subsequently to be used for the reproduction of recorded images. Following the development of the films with the photographed colored panels, steps S1 to S5 are carried out, so that the reconstructed normalized film exposures $\eta_r^N, \eta_g^N, \eta_b^N$ are obtained for the colored areas. These exposures can then be assigned directly to the previously measured LAB color values.

The above-described method according to the invention for the automatic reproduction of the colors of the original scene from an electronically scanned original image, which is present as a color negative or diapositive film, has a number of advantages with respect to the method according to the prior art. The gray straight line 21 is determined not as a connecting line between a highlight point and a shadow point in each case, but from all the scanned image points, as an optimal approximation of the principal axis of the cloud of points 20 in the RGB color space. As a result, the gray straight line 21 is determined with greater certainty, so that the reproduction is carried out without any remaining color cast. As a result of the saturation correction of the scanned densities, the saturation effects in the color layers of the film material and scanning errors are at least partly calculated out. As a result, the linear range of the color density curves is widened and a more ideal film material is simulated, with which the image quality of the reproduced image is improved. The adaptation of the range is carried out independently of the reconstruction of the image exposure straight lines 22. As a result, the method can be adapted more flexibly to the reproduction conditions, and reproduction errors in the regions of very light or very dark colors can be avoided.

We claim:

1. A method for automatic reproduction of colors of an original scene from an original image, which comprises:

presenting the original image as one of an electronically scanned color negative and an electronically scanned diapositive film having image points;

storing RGB color values of image points as one of the group consisting of scanned transmissions and scanned densities;

determining, in an RGB color space, a gray straight line optimally approximating a principal axis of a cloud of points formed by scanned densities of the image points;

determining corrected transmissions to which corrected densities correspond by respectively subtracting minimum transmission values from the scanned transmissions;

determining reconstructed film exposures utilizing the corrected transmissions, whereby, film exposure straight lines are constructed with the gray straight line, the film exposure straight lines describing a relationship between logarithmic film exposures and the corrected densities; and projecting the reconstructed film exposures onto an image range between a normalized highlight fixed point and a normalized shadow fixed point, and determining normalized film exposures.

2. The method according to claim 1, which further comprises determining a direction of the gray straight line by an eigenvector with a largest eigenvalue of a covariance matrix of image point vectors, components of each image point vector being the scanned densities of the image point.

3. The method according to claim 2, wherein the gray straight line runs through a center of gravity of the cloud of points.

4. The method according to claim 2, wherein the gray straight line runs through a predefined neutral shadow point.

5. The method according to claim 1, wherein the gray straight line runs through a center of gravity of the cloud of points.

6. The method according to claim 1, wherein the gray straight line runs through a predefined neutral shadow point.

7. The method according to claim 1, which further comprises determining the minimum transmission values from a condition where the corrected densities of an image point of maximum density lie on the gray straight line.

8. The method according to claim 1, which further comprises transforming the normalized film exposures into a LAB color space.

* * * * *